United States Patent
Hosaka et al.

(10) Patent No.: US 10,562,401 B2
(45) Date of Patent: Feb. 18, 2020

(54) MOTOR DRIVING CONTROL APPARATUS AND ELECTRICALLY ASSISTED VEHICLE

(71) Applicant: TAIYO YUDEN CO., LTD., Tokyo (JP)

(72) Inventors: Yasuo Hosaka, Tokyo (JP); Satoru Shimizu, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 26 days.

(21) Appl. No.: 15/719,002

(22) Filed: Sep. 28, 2017

(65) Prior Publication Data

US 2018/0093588 A1  Apr. 5, 2018

(30) Foreign Application Priority Data

Sep. 30, 2016 (JP) .................................. 2016-192800
Aug. 29, 2017 (JP) .................................. 2017-164046

(51) Int. Cl.
*H02P 6/16* (2016.01)
*B60L 15/20* (2006.01)
(Continued)

(52) U.S. Cl.
CPC ........... *B60L 15/2045* (2013.01); *B62M 6/45* (2013.01); *B62M 6/90* (2013.01); *H02K 7/14* (2013.01);
(Continued)

(58) Field of Classification Search
CPC ...... B60L 7/18; B60L 11/007; B60L 2200/12; H02P 6/16; H02P 27/04; H02P 7/14; B62M 6/45; B62M 6/60; B62M 6/50
See application file for complete search history.

(56) References Cited

U.S. PATENT DOCUMENTS 3,921,745 A * 11/1975 McCulloch ............... B60L 7/12
                                                         180/206.1
5,924,511 A *  7/1999 Takata ................. B60L 11/1801
                                                         180/206.2
(Continued)

FOREIGN PATENT DOCUMENTS

CN   201296185 Y    8/2009
CN   201660093 U   12/2010
(Continued)

OTHER PUBLICATIONS

European Search Report dated Mar. 16, 2018, in a counterpart European patent application No. 17001572.1.
(Continued)

*Primary Examiner* — Rina I Duda
(74) *Attorney, Agent, or Firm* — Chen Yoshimura LLP

(57) ABSTRACT

A motor driving control apparatus in the embodiment includes: a first controller configured to control powering and regeneration of a motor; a second controller configured to control the first controller; and assistant circuitry configured to activate the second controller in a stop state, when a counter electromotive force caused by the motor, which is rotated without control by the first controller, satisfies a predetermined condition, before a power-on instruction for the motor driving control apparatus is made or in a state where the power-on instruction for the motor driving control apparatus is not made.

15 Claims, 6 Drawing Sheets

(51) Int. Cl.
*H02K 7/14* (2006.01)
*H02P 3/14* (2006.01)
*H02P 1/08* (2006.01)
*B62M 6/45* (2010.01)
*B62M 6/90* (2010.01)
*H02P 27/06* (2006.01)

(52) U.S. Cl.
CPC ............. *H02P 1/08* (2013.01); *H02P 3/14* (2013.01); *H02P 6/16* (2013.01); *H02P 27/06* (2013.01); *B60L 2200/12* (2013.01); *B60L 2240/54* (2013.01); *H02P 2205/05* (2013.01)

(56) References Cited

U.S. PATENT DOCUMENTS

| | | | | |
|---|---|---|---|---|
| 6,320,336 | B1 * | 11/2001 | Eguchi | B62M 6/45 180/206.2 |
| 6,690,127 | B2 * | 2/2004 | Birkestrand | B62M 6/40 318/139 |
| 6,874,592 | B2 * | 4/2005 | Yokotani | B62J 99/00 180/206.2 |
| 7,082,018 | B2 * | 7/2006 | Honda | B60L 7/22 361/18 |
| 7,165,641 | B2 * | 1/2007 | Kitamura | B60L 1/16 180/206.2 |
| 7,357,209 | B2 * | 4/2008 | Kokatsu | B62M 6/45 180/206.2 |
| 8,004,225 | B2 * | 8/2011 | Takeuchi | H02P 6/28 318/479 |
| 8,541,966 | B2 * | 9/2013 | Takeuchi | H02P 6/28 318/400.04 |
| 8,634,979 | B2 * | 1/2014 | Chien | B62M 6/50 280/282 |
| 2011/0074214 | A1 | 3/2011 | Takao et al. | |
| 2011/0304200 | A1 | 12/2011 | Saida et al. | |
| 2012/0256575 | A1 | 10/2012 | Chien et al. | |
| 2014/0191705 | A1 | 7/2014 | Takao et al. | |
| 2016/0202710 | A1 | 7/2016 | Hosaka et al. | |

FOREIGN PATENT DOCUMENTS

| | | |
|---|---|---|
| CN | 102035228 A | 4/2011 |
| CN | 202827974 U | 3/2013 |
| CN | 105480369 A | 4/2016 |
| CN | 105857115 A | 8/2016 |
| EP | 2957449 A1 | 12/2015 |
| JP | H09254861 A | 9/1997 |
| JP | 2001122182 A | 5/2001 |
| JP | 2005145309 A | 6/2005 |
| JP | 2008-283786 A | 11/2008 |
| JP | 2011-255841 A | 12/2011 |
| JP | 2012041030 A | 3/2012 |
| JP | 2014-180208 A | 9/2014 |
| JP | 2015037896 A | 2/2015 |
| JP | 2015-145238 A | 8/2015 |
| TW | M382655 U1 | 6/2010 |
| TW | 201242235 A1 | 10/2012 |

OTHER PUBLICATIONS

Taiwanese Office Action dated Jun. 21, 2018, in a counterpart Taiwanese patent application No. 106130230. (A partial translation is attached as a concise explanation of relevance.).

Chinese Office Action dated Apr. 25, 2019, in a counterpart Chinese patent application No. 201710905658.0. (A partial translation is attached as a concise explanation of relevance.).

* cited by examiner

MOTOR DRIVING CONTROL APPARATUS AND ELECTRICALLY ASSISTED VEHICLE

CROSS-REFERENCE TO RELATED APPLICATIONS

This application is based upon and claims the benefit of priorities of the prior Japanese Patent Applications No. 2016-192800, filed on Sep. 30, 2016 and No. 2017-164046, filed on Aug. 29, 2017, the entire contents of which are incorporated herein by reference.

FIELD

This invention relates to a motor driving control apparatus and an electrically assisted vehicle having the motor driving control apparatus.

BACKGROUND

For example, when an electrically assisted bicycle that is one of electrically assisted vehicles is used, there is a case where a driver starts pedaling without turning on a power switch of that control panel, and he or she becomes aware that he or she forgot the turn-on of the power switch, because he or she feels the pedal is heavier than usual.

In addition, a battery pack of the electrically assisted bicycle typically monitors a state of a battery, and has a battery state monitoring function that appropriately performs an output limit protection when detecting an abnormal state such as overdischarge, overcharge, overcurrent and overheat. This battery state monitoring function may have an automatic shut-down function. In other words, the automatic shut-down function is a function to stop the monitoring of the battery state by shutting off the output of the battery pack to shift the state to the shut-down state (which may be called "a power-saving state"), when a certain length of unused period of the battery pack occurs. Accordingly, it becomes also possible to avoid a situation that the battery is discharged to be empty by the self consumption of the battery state monitoring function during the long unused period of the battery pack, and the charging of the battery to some extent is required when the battery is used again. Furthermore, it is possible to prevent the battery from causing the performance deterioration due to the overdischarge and from becoming an abnormal state that it is impossible to recover the performance due to the overdischarge.

However, once the battery pack becomes the shut-down state, it is conventionally required to firstly remove the battery pack from the electrically assisted bicycle and set the removed battery pack to a battery charger, which is connected with a commercial power supply, to make the battery pack return from the shut-down state, in order to make the assisted running possible. This has a problem that the trouble of the driver is required.

For example, there is a conventional technique that, in order to solve a problem that it is impossible to supply the power to electrical equipments such as a headlight of the electrically assisted bicycle, when there is no remaining battery charge of the electrically assisted bicycle, the counter electromotive force caused by the rotations of the motor is rectified and transformed to supply the power to the electrical equipments. However, because it is assumed that there is no remaining battery charge, the problem mentioned in the previous paragraph is not considered in this technique.

Patent Document 1: Japanese Laid-open Patent Publication No. 2008-283786

Patent Document 2: Japanese Laid-open Patent Publication No. 2014-180208

Namely, there is no technique to enhance usability of the user when starting the operation of an apparatus with which the motor driving control apparatus is equipped.

SUMMARY

A motor driving control apparatus, which relates to the present invention, includes: (A) a first controller configured to control powering and regeneration of a motor; (B) a second controller configured to control the first controller; and (C) assistant circuitry configured to activate the second controller in a stop state, when a counter electromotive force caused by the motor, which is rotated without control by the first controller, satisfies a predetermined condition, before a power-on instruction for the motor driving control apparatus is made or in a state where the power-on instruction for the motor driving control apparatus is not made.

DESCRIPTION OF EMBODIMENTS

Embodiment 1

In the following, embodiments of this invention will be explained by using an example of an electrically assisted bicycle, which is an example of the electrically assisted vehicle. However, the embodiments of the present invention can be applied not only to the electrically assisted bicycle, but also to a motor driving control apparatus for a motor or the like to assist the movement of a mobile apparatus that moves according to a human power (e.g. a hand truck, wheelchair, a lift).

Figure 1:
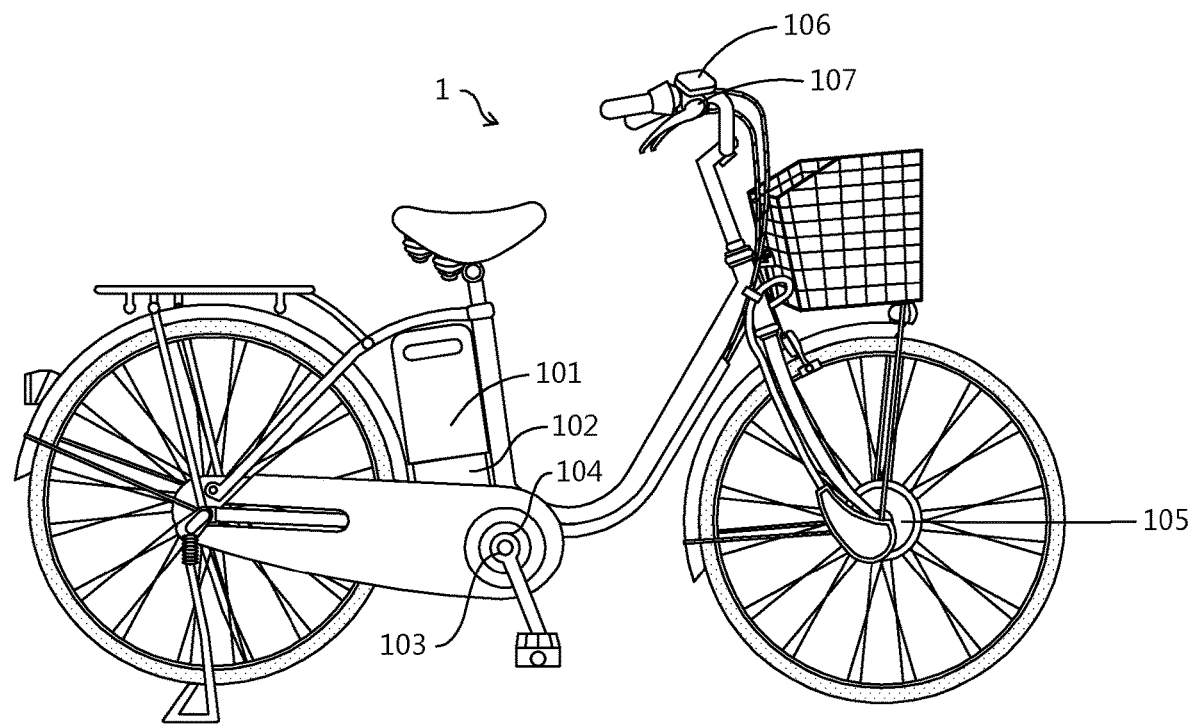
FIG. 1 is an exterior view diagram of an electrically assisted vehicle relating to embodiments of this invention.

FIG. 1 depicts an exterior view of the electrically assisted bicycle. The electrically assisted bicycle 1 has a battery pack 101, a motor driving control apparatus 102, a toque sensor 103, a pedal rotation sensor 104, a motor 105, a control panel 106 and a brake sensor 107. The electrically assisted bicycle 1 also has a headlight, a freewheel and a transmission.

The battery pack 101 includes, for example, a lithium ion secondary battery, a lithium ion polymer secondary battery, a nickel-metal hydride battery or the like, and supplies the power to the motor 105 through the motor driving control apparatus 102 and charges the battery by a regenerative power from the motor 105 through the motor driving control apparatus 102 at the regeneration.

The torque sensor 103 is provided on a wheel, which is installed in the crankshaft, detects a pedal force from the driver, and outputs this detection result to the motor driving control apparatus 102. Similarly to the torque sensor 103, the pedal rotation sensor 104 is provided in the wheel, which is installed on the crankshaft, and outputs pulse signals, which depend on the rotation of the crankshaft, to the motor driving control apparatus 102.

The motor 105 is, for example, a well-known three-phase brushless motor, and mounted on the front wheel of the electrically assisted bicycle 1. The motor 105 rotates the front wheel, and also a rotor is connected directly or via a reducer to the front wheel so as to rotate according to the rotation of the front wheel. Furthermore, the motor 105 is equipped with a rotation sensor such as a hall effect sensor to output rotation information of the rotor (e.g. a hall signal) to the motor driving control apparatus 102.

The motor driving control apparatus 102 performs predetermined computing based on signals from the rotation sensor of the motor 105, torque sensor 103, pedal rotation sensor 104 and the like to control the driving of the motor 105 and also control the regeneration by the motor 105.

For example, the control panel 106 accepts, from a user, an instruction input regarding whether or not the assist should be performed (e.g. ON or OFF of the power switch), and an input of a desired assist ratio or the like if the assist should be performed, and outputs the instruction inputs and the like to the motor driving control apparatus 102. In addition, the control panel 106 may have a function to display data such as a running distance running time, consumed calories, and/or regenerated electric energy, which are results computed by the motor driving control apparatus 102. Furthermore, the control panel 106 may have a display unit having, for example, Light Emitting Diodes (LEDs). Accordingly, the display unit may display, for the driver, a charging level of the battery pack 101, a state of power-on or off, a mode corresponding to the desired assist ratio and the like.

The brake sensor 107 detects a brake operation of the driver and outputs signals regarding the brake operation to the motor driving control apparatus 102.

Figure 2B:
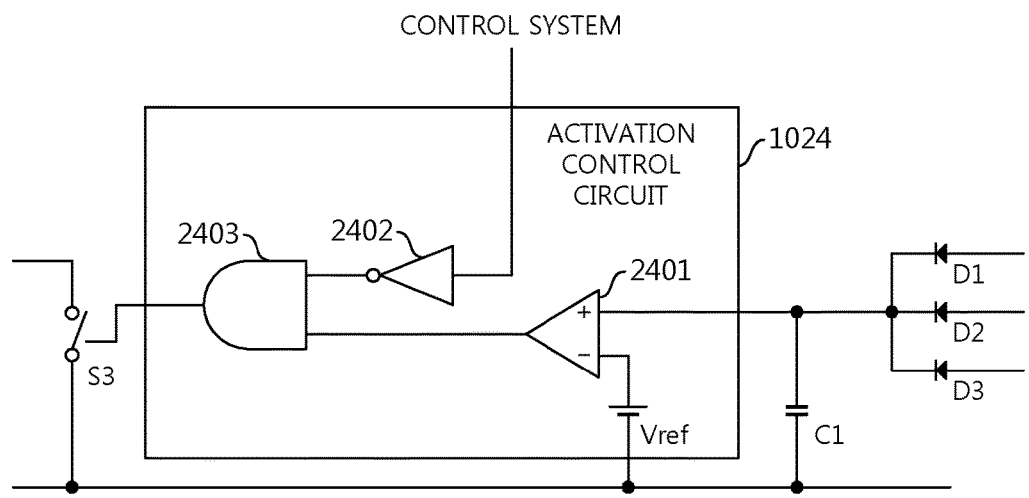
FIG. 2B is a diagram depicting a circuit example of an activation control circuit.
Figure 2A:
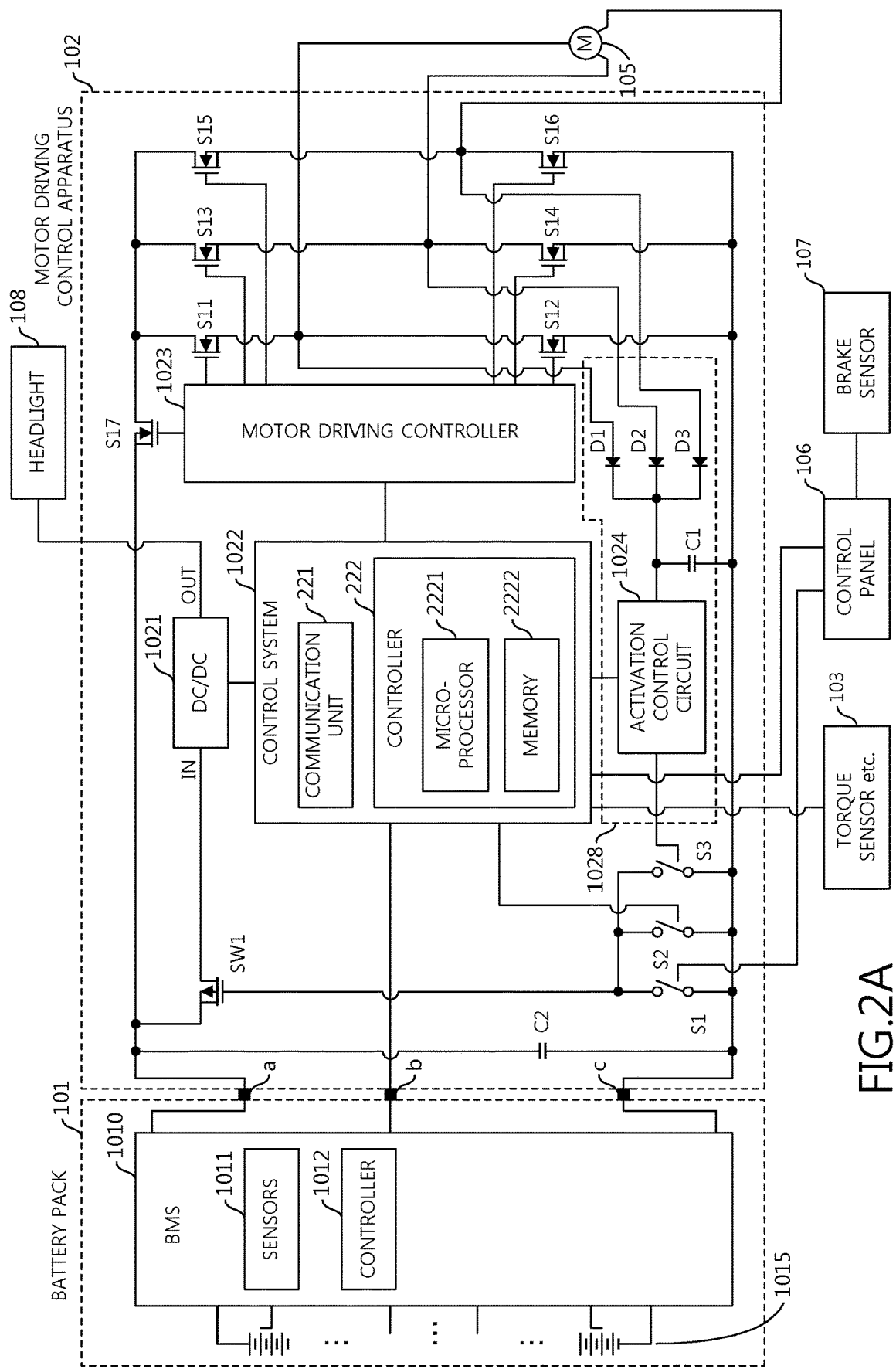
FIG. 2A is a functional block diagram of a battery pack and a motor driving control apparatus, which relate to a first embodiment.

FIG. 2A illustrates the motor driving control apparatus 102 and battery pack 101, which relate to this embodiment. FIG. 2A illustrates a state in which the battery pack 101 are coupled with the motor driving control apparatus 102, and a headlight 108 whose light-on and light-out are controlled by the motor driving control apparatus 102, the torque sensor 103, the control panel 106, the brake sensor 107, the motor 105 and the like are connected with the motor driving control apparatus 102.

The battery pack 101 relating to this embodiment has a Battery Management System (BMS) 1010 and battery cells 1015. The battery management system 1010 has sensors 1011 and a controller 1012.

The sensors 1011 are sensors to observe internal states of the battery pack 101, such as temperatures of the battery cells 1015 and switches (not depicted), the entire voltage of the battery cells 1015 and/or voltages of respective cells included in the battery cells 1015. The controller 1012 is realized, for example, by a microprocessor that executes predetermined programs, and has a state monitoring function of the battery, a control function of the charging and discharging, a communication function with the motor driving control apparatus 102 and the like.

The battery pack 101 is connected with the motor driving control apparatus 102 through a connecting part "a" for the power supply and charging, a connecting part "b" for the communication and a connecting part "c" for grounding. A connecting part for state outputs of the battery pack 101 may be provided in the battery pack 101, additionally. Furthermore, plural connecting parts "b" for the communication may be provided.

The motor driving control apparatus 102 relating to this embodiment has a bridge circuit including Field Effect Transistors (FETs) S11 to S16, a PET S17, a motor driving controller 1023, diodes D1 to D3, capacitors C1 and C2, switches S1 to S3, a FET SW1, a DC/DC converter 1021 and a control system 1022 and an activation control circuit 1024. FET is one kind of switch.

The motor driving controller 1023 controls switching of PETs S11 to S17 in response to instruction from the control system 1022. For example, when the motor 105 is driven by power driving or regenerative driving, the PET S17 is turned ON, and the FETs S11 to S16 are turned ON or OFF according to predetermined patterns. The motor driving controller 1023 receives a power supply from the DC/DC converter 1021.

The DC/DC converter 1021 converts an output voltage of the battery pack 101 to a voltage for the control panel 106, headlight 108 and control system 1022, and outputs the converted voltage to the control panel 106, headlight 108, control system 1022 and the like. Therefore, the DC/DC converter 1021 is connected with the connecting part "a" for the power supply and charging through the PET SW1. The drain of the PET SW1 is connected with the DC/DC converter 1021, and the source of the FET SW1 is connected to the connecting part "a" for the power supply and charging, and the gate of the FET SW1 is connected to one end of the switches S1 to S3. In addition, the capacitor C2 is connected between a line connected with the connecting part "a" and a line connected with the connecting part "c".

The switches S1 to S3 are connected in parallel, and when any one of the switches S1 to S3 is turned ON, the FET SW1 is turned ON, and the electrical power from the battery pack 101 is supplied to the DC/DC converter 1021. Typically, when the driver pushes the power switch on the control panel 106 in order to make the motor driving control apparatus 102 operate, the switch S1 is turned ON. Therefore, the electrical power from the battery pack 101 is supplied to the DC/DC converter 1021, and further supplied to the control system 1022 from the DC/DC converter 1021. Accordingly, the control system 1022 is activated, and turns ON the switch S2. The switch S1 is turned ON only while the power switch is pushed, and the control system 1022 is activated during that period. While the control system 1022 is operating, the control system 1022 continues to turn ON the switch S2.

In this embodiment, in addition to such a configuration, the motor driving controller 1023 has, as assisting elements to assist the activation of the control system 1022, the switch S3 and an assistant unit 1028. The assistant unit 1028 has an activation control circuit 1024, the capacitor C1 and diodes D1 to D3. In FIG. 2A, the diodes D1 to D3 are provided as one example, however, any one or only two diodes may be provided. When the number of diodes is greater, it is easier to stabilize the output voltage.

The anode of the diode D1 is connected with the source of the PET S11 and the drain of the FET S12, the anode of the diode D2 is connected with the source of the PET S13 and the drain of the FET S14, and the anode of the diode D3 is connected with the source of the FET S15 and the drain of the FET S16. The cathodes of the diodes D1 to D3 are connected with one end of the capacitor C1 and an input of the activation control circuit 1024. The other end of the capacitor C1 is connected to the connecting part "c" for grounding. With this configuration, in a state where the power switch is not ON and the power driving or regenerative driving is not performed by the PETs S11 to S16, the voltage due to the counter electromotive force caused by the rotation of the motor 105 is rectified, and the rectified voltage is inputted into the activation control circuit 1024.

The counter electromotive force that is proportional to the rotation rate of the motor 105 occurs. Therefore, when the rotation rate becomes equal to or greater than a certain rate, the voltage that is equal to or greater than a predetermined voltage. Then, the activation control circuit 1024 determines whether or not the voltage is equal to or greater than the predetermined voltage.

The activation control circuit 1024 is connected with the control system 1022, and in a state where the control system 1022 is not activated, when the rectified voltage becomes equal to or greater than the predetermined voltage, the activation control circuit 1024 turns ON the switch S3. By this operation, the PET SW1 is turned ON. Therefore, in a typical case, the power supply from the battery pack 101 is made for the DC/DC converter 1021, and the control system 1022 is activated. As described above, when the control system 1022 is activated, the control system 1022 turned ON the switch S2. Therefore, the control system 1022 instructs the activation control circuit 1024 to turn OFF the switch S3. Then, in response to the instruction, the activation control circuit 1024 turns OFF the switch S3.

FIG. 2B depicts a circuit example of the activation control circuit 1024. The activation control circuit 1024 has a comparator 2401, a power supply Vref, a NOT circuit 2402 and an AND circuit 2403. The positive input terminal of the comparator 2401 is connected with the cathode of the diodes D1 to D3, and the negative input terminal thereof is connected to a positive terminal of the power supply Vref. The negative terminal of the power supply Vref is grounded. In other words, the comparator 2401 determines whether or not the voltage due to the counter electromotive force of the motor 105 is equal to or greater than the predetermined voltage Vref, and when the voltage due to the counter electromotive force of the motor 105 is equal to or greater than Vref, the comparator 2401 outputs HIGH, and when the voltage due to the counter electromotive force of the motor 105 is less than Vref, the comparator 2401 outputs LOW. The input of the NOT circuit 2402 is connected with the control system 1022. The control system 1022 outputs HIGH during its operation, and outputs LOW while the control system 1022 stops. Therefore, the NOT circuit 2402 outputs LOW during the operation of the control system 1022, and outputs HIGH while the control system 1022 stops. The first input of the AND circuit 2403 is connected with the output of the NOT circuit 2402, and the second input thereof is connected with the output of the comparator 2401. In other words, the AND circuit 2403 outputs HIGH to turn ON the switch S3 when the control system 1022 stops and the voltage due to the counter electromotive force of the motor 105 is equal to or greater than Vref. On the other hand, the AND circuit 2403 outputs LOW to turn OFF the switch S3 while the control system 1022 is operating or when the voltage due to the counter electromotive force of the motor 105 is less than Vref. The comparator 2401, NOT circuit 2402 and AND circuit 2403 may be composed of passive circuit elements, may be configured to be powered by the counter electromotive force of the motor 105, or may be configured to be powered by an auxiliary power supply that is other than the battery pack 101. In a certain situation, they may be configured to be powered by the battery pack 101.

The electrical power from the DC/DC converter 1021 is supplied to the control system 1022. In addition, the control system 1022 is connected with the motor driving controller 1023, and instructs the motor driving controller 1023 to make the PETs S11 to S16 perform ON and OFF in the predetermined pattern, and to make the PET S17 perform ON and OFF. Furthermore, the control system 1022 is connected to the torque sensor 103, pedal rotation sensor 104, control panel 106, brake sensor 107, rotation sensor in the motor 105 and the like, and communicates with the battery management system 1010 in the battery pack 101 through the connecting part "b" for the communication, and controls the entire motor driving control apparatus 102 based on the state of the battery pack 101, operational instructions for the control panel 106 and data obtained from the respective sensors.

The control system 1022 has a communication unit 221 to communicate with the controller 1012 of the battery management system 1010 in the battery pack 101, and a controller 222 to perform various types of controls in cooperation with the communication unit 221. The controller 222 has a microprocessor 2221 to execute predetermined programs, for example, and a memory 2222 (which includes a Random Access Memory (RAM) and Read Only Memory (ROM) and the like) to record the predetermined programs and store data in the processing. In other words, when the microprocessor 2221 executes the predetermined programs, the control functions relating to this embodiment are realized.

Figure 3:
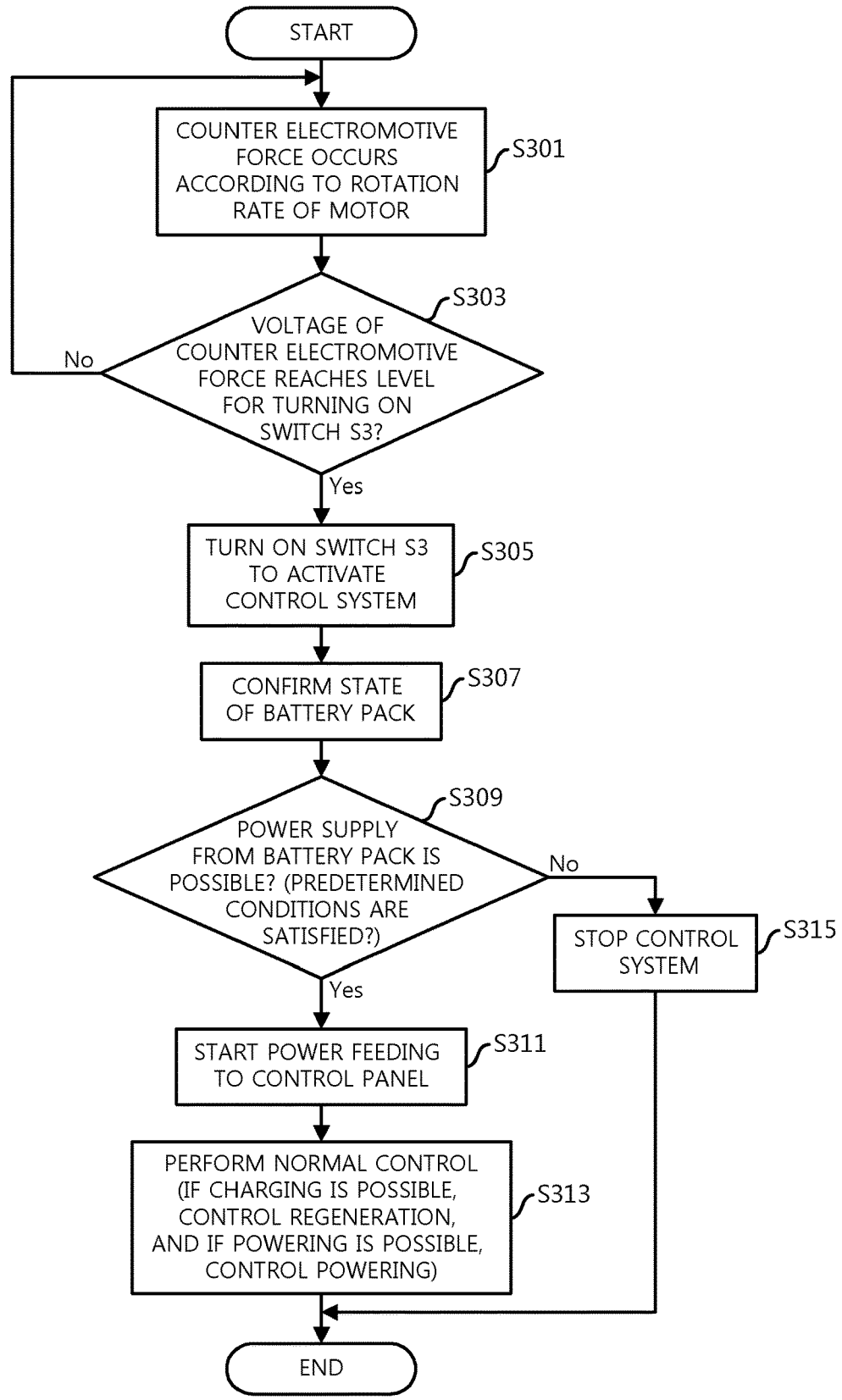
FIG. 3 is a diagram depicting an operational flow relating to the first embodiment.

Next, the detailed operational flow of the configuration depicted in FIG. 2A will be explained by using FIG. 3.

For example, when the driver starts pedaling of the electrically assisted bicycle 1 without pressing the power switch on the control panel 106, the motor 105 equipped in the front wheel rotates. Because the power switch of the control panel 106 is not pressed, the motor driving control apparatus 102 including the control system 1022 does not work. In other words, the FETs SW1 and S17 are OFF, and the switches S1 to S3 are also OFF. Because the motor driving controller 1023 also does not work, the high impedance state of the FETs S11 to S16 is kept.

In this state, the counter electromotive force that corresponds to the rotation rate of the motor 105 occurs (step S301 in FIG. 3), and the voltage caused by the counter electromotive force is rectified by a rectification circuit including the diodes D1 to D3 and the capacitor C1.

Then, the activation control circuit 1024 determines whether or not the rectified voltage reaches a level at which the switch S3 should be turned ON (step S303). When the rotation rate becomes equal to or greater than the predetermined rate, it is presumed that the driver forgot to press the power switch in the running and it is possible to activate the microprocessor 2221. Therefore, at this step, it is determined whether or not the rectified voltage reaches the voltage that corresponds to the rotation rate equal to or greater than the predetermined rate.

When the rectified voltage does not reach the level for turning ON the switch S3, the processing returns to the step S301, and the check of the rectified voltage continues until the rectified voltage reaches the level for turning ON the switch S3. In this state, when the driver presses the power switch of the control panel 106, the control system 1022 is activated as usual, and turning ON the switch S3 by the activation control circuit 1024 is stopped.

On the other hand, when the rectified voltage reaches the level for turning ON the switch S3, the activation control circuit 1024 activates the control system 1022 by turning ON the switch S3 (step S305). More specifically, when the activation control circuit 1024 turns ON the switch S3, the FET SW1 is turned ON, and when the battery pack 101 is not in the shut-down state, the power supply from the battery pack 101 is made for the DC/DC converter 1021. The DC/DC converter 1021 converts the output voltage of the battery pack 101 to a voltage for the control system 1022 and the like to output the converted voltage to the control system 1022. Then, the control system 1022 is activated.

When the battery pack 101 is in the shut-down state, the control system 1022 cannot be activated, because the voltage at the connecting part "a" for the power supply and charging is maintained to be low. Therefore, the processing ends.

When the battery pack 101 is not in the shut-down state, the control system 1022 is activated, and the control system 1022 turns ON the switch S2. In addition, the control system 1022 causes the activation control circuit 1024 to turn OFF the switch S3.

Furthermore, the controller 222 of the control system 1022 communicates with the controller 1012 of the battery management system 1010 in the battery pack 101 through the connecting part "b" for the communication by using the communication unit 221 to confirm the state of the battery pack 101 (step S307). For example, the controller 222 obtains data such as the temperatures of the battery cells 1015, the charging level, voltage states of the battery cells 1015, the usage history and the operation mode. However, information regarding whether or not the battery pack 101 is in the shut-down state, and/or information regarding whether or not the battery pack 101 is chargeable may be obtained from connecting parts other than the connecting part "b" for the communication. Such information is outputted by the controller 1012 of the battery management system 1010 in the battery pack 101.

Then, the controller 222 of the control system 1022 determines whether or not the power supply from the battery pack 101 is possible, based on the state of the battery pack 101, which is obtained by the communication or the like (step S309).

For example, the controller 222 determines whether or not the charging level is a level at which the control system 1022 can work continuously. In addition to that, the controller 222 may determine whether or not the battery pack 101 can supply the electrical power, based on the state of the battery pack 101 such as the temperatures.

When it is determined that the power supply from the battery pack 101 is impossible, the control system 1022 stops its operation (step S315). The switch S2 is turned OFF, and the FET SW1 is turned OFF.

On the other hand, when the power supply from the battery pack 101 is possible, the controller 222 of the control system 1022 starts the power supply to the control panel 106 (step S311). By this step, display by the LED or the like is made on the control panel 106, and the driver can recognizes that the motor driving control apparatus 102 is automatically activated.

Moreover, the controller 222 of the control system 1022 performs normal control (step S313). More specifically, when it is possible, based on the state of the battery pack 101, to charge the battery pack 101, the controller 222 causes the motor driving controller 1023 to perform appropriate regenerative driving at appropriate timings. In addition, when it is possible, based on the state of the battery pack 101, to perform the power driving, the controller 222 causes the motor driving controller 1023 to perform appropriate power driving at appropriate timings.

For example, when the charging is possible and the charging level is low, the regenerative driving is initially performed to heighten the charging level, and when the charging level is heightened to a certain level, the power driving is also performed. On the other hand, when the charging level is equal to or greater than the certain level, the power driving and regenerative driving are switched according to the running state.

By adopting such a configuration, even when the driver forgets the instruction of the operation start for the motor driving control apparatus 102 and starts running, the motor driving control apparatus 102 automatically starts its operation. Therefore, the usability for the driver is enhanced.

In addition, when, according to the state of the battery pack 101, it is impossible to continuously operate the motor driving control apparatus 102, the power supply to the control panel 106 is not performed. Therefore, the driver cannot recognize the automatic activation of the control system 1022. By this feature, the driver is not bothered wastefully. The driver may recognize such a battery state and may not press the power switch intentionally. In such a case, it is appropriate not to supply the power to the control panel 106.

However, when the operational flow shifts to the step S315, it may be possible to display, on the control panel 106, that it is impossible to automatically activate the motor driving control apparatus 102 and notify its reason in order to make the driver pay attention. In addition, a setting representing whether or not the automatic activation is allowed may be made in advance for the control system 1022, and the setting may be checked at the step S309. Then, when the setting representing that the automatic activation is not allowed, the operational flow shifts to the step S315, and when the setting representing that the automatic activation is allowed, other conditions are determined at the step S309. When the automatic activation is not allowed, the control system 1022 outputs HIGH to the activation control circuit 1024 (FIG. 2B). Then, similarly to the control system 1022 being operating, the switch S3 is turned OFF. Therefore, the control system 1022 is not automatically activated and does not continue its operation.

Embodiment 2

In this embodiment, the activation of the motor driving control apparatus 102, charging of the battery pack 101, regenerative driving and power driving of the motor 105 and the like are elaboratively controlled according to various situations of the battery pack 101.

Figure 4:
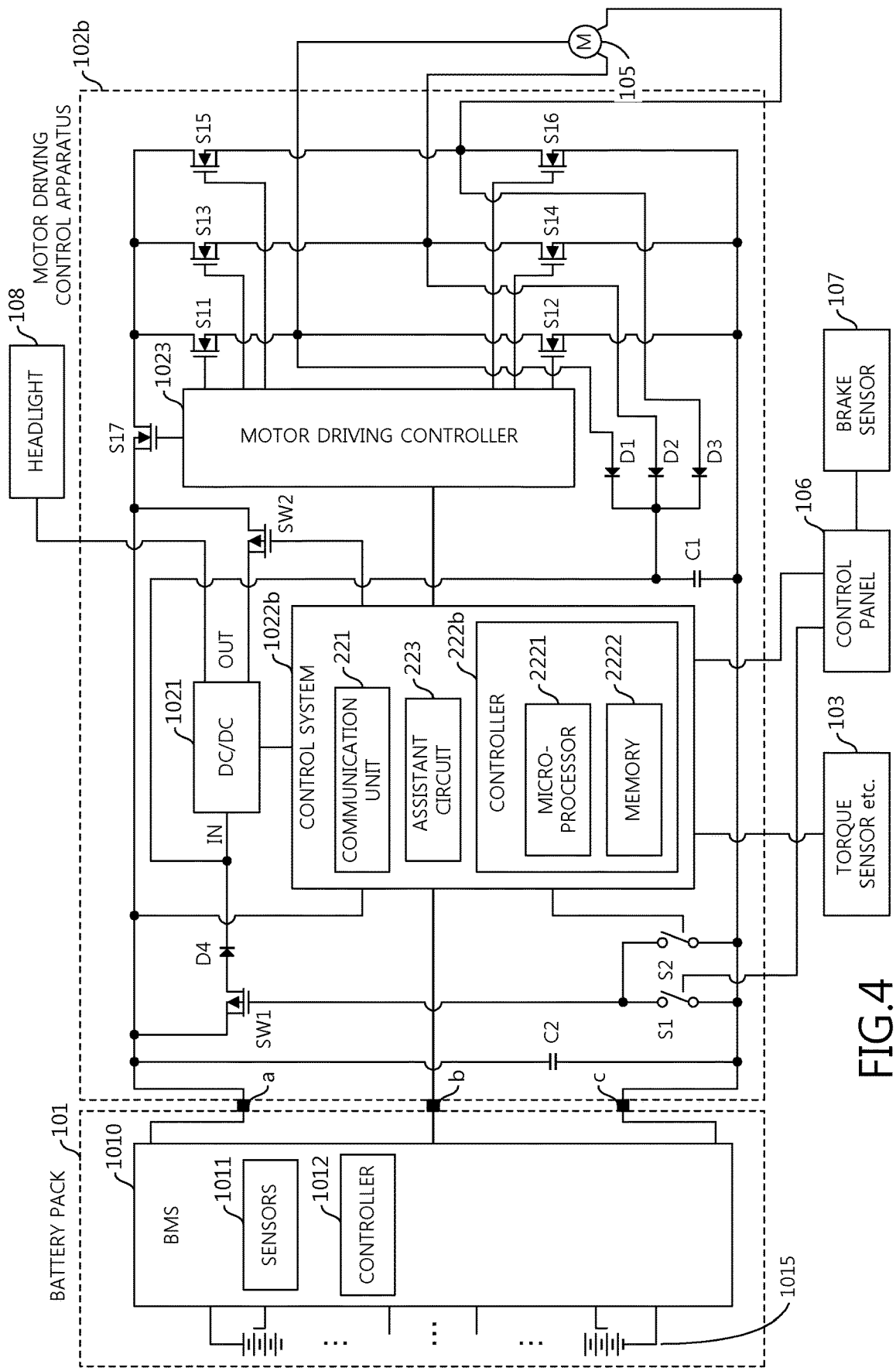
FIG. 4 is a functional block diagram of a battery pack and a motor driving control apparatus, which relate to a second embodiment.

The configurations of the motor driving control apparatus 102b and the battery pack 101, which relate to this embodiment, are depicted in FIG. 4. The same reference numbers are attached to the same components as those of the motor driving control apparatus 102, which relates to the first embodiment depicted in FIG. 2A.

Because the configuration of the battery pack 101 relating to this embodiment is the same as that in the first embodiment, the explanation is omitted.

The motor driving control apparatus 102b relating to this embodiment has a bridge circuit including FETs S11 to S16, a motor driving controller 1023, diodes D1 to D4, capacitors C1 and C2, switches S1 and S2, PETs SW1 and SW2, a DC/DC converter 1021 and a control system 1022b.

An output of a rectifier circuit including the diodes D1 to D3 and the capacitor C1 is connected with an input of the DC/DC converter 1021. In the first embodiment, the drain of FET SW1 is connected to the input of the DC/DC converter 1021, however, in this embodiment, it is connected to an anode of the diode D4, and the cathode of the diode D4 is connected to the input of the DC/DC converter 1021. In other words, the diode D4 is provided so that the output current of the rectifier does not reversely flow into the battery pack 101 through the PET SW1.

In addition, the control system 1022*b* is also connected to a line connected with the connecting part "a" for the power supply and charging. Therefore, the control system 1022*b* itself can determine whether or not the battery pack 101 is in the shut-down state, based on the output voltage of the battery pack 101.

Moreover, the source of the FET SW2 is connected to the output of the DC/DC converter 1021, and the drain thereof is connected to the line connected with the connecting part "a" for the power supply and charging, and the gate thereof is connected with the control system 1022*b* itself. In other words, whether or not the charging of the battery pack 101 is performed by using the output power of the DC/DC converter 1021 is controlled by the FET SW2.

The operations of the motor driving controller 1023 and FETs S11 to S17 are the same as those in the first embodiment.

The control system 1022*b* accepts the power supply from the DC/DC converter 1021. In addition, the control system 1022*b* is connected with the motor driving controller 1023, and instructs the motor driving controller 1023 to cause the FETs S11 to S16 to perform switching (ON/OFF) in a predetermined pattern and to cause the FET S17 to perform switching (ON/OFF). Furthermore, the controller system 1022*b* is connected with the torque sensor 103, the pedal rotation sensor 104, the control panel 106, the brake sensor 107, the rotation sensor of the motor 105 and the like, and further perform the communication with the battery management system 1010 of the battery pack 101 through the connecting part "b" for the communication, and controls the entire motor driving control apparatus 102*b* based on data obtained by the respective sensors and the operational instructions for the control panel 106.

The control system 1022*b* has a communication unit 221 to communicate with the controller 1012 of the battery management system 1010 in the battery pack 101, a controller 222*b* to perform various controls in cooperation with the communication unit 221, and an assistant circuit 223 to assist the activation of the control system 1022*b*. The controller 222*b* has a microprocessor 2221 that execute, for example, predetermined programs, and a memory 2222 (including a RAM and a ROM) to record the predetermined programs and store data being processed. In other words, when the microprocessor 2221 executes the predetermined programs, the control functions relating to this embodiment are realized in cooperation with the assistant circuit 223.

An assistant unit is an unit to assist the activation of the control system 1022*b* relating to this embodiment includes the diodes D1 to D4, the capacitor C1, the DC/DC converter 1021, and the assistant circuit 223 of the control system 1022*b*.

Figure 5A:
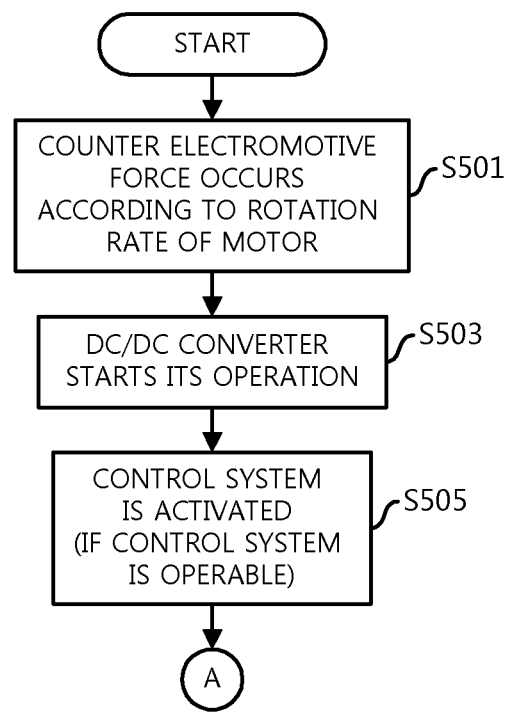
FIG. 5A is a diagram depicting an operational flow relating to the second embodiment.

Next, by using FIGS. 5A and 5B, the detailed operational flow of the configuration depicted in FIG. 4 will be explained.

Similarly to the first embodiment, when the driver does not press the power switch of the control panel 106 and starts pedaling of the electrically assisted bicycle 1, the motor 105 equipped in the front wheel rotates. Because the power switch of the control panel 106 is not pressed, the motor driving control apparatus 102*b* that includes the control system 1022*b* does not work. In other words, the FETs SW1 and S17 are OFF, and the switches S1 and S2 are also OFF. Because the motor driving controller 1023 also does not work, the FET S11 to S16 is kept to be in the high-impedance state. Initially, the FETs SW1 and SW2 are off.

In this state, when the counter electromotive force that corresponds to the rotation rate of the motor 105 occurs (FIG. 5A: step S501), the rectifier including the diodes D1 to D3 and the capacitor C1 rectifies the voltage caused by the counter electromotive force.

When the rotation rate of the motor 105 increases and the rectified voltage increases up to the voltage at which the DC/DC converter 1021 can work, the DC/DC converter 1021 starts its operation (step S503).

When the DC/DC converter 1021 starts its operation, the voltage for the control system 1022*b* and the like is outputted to the control system 1022*b*. Then, the control system 1022*b* is activated (step S505). Before the step S505, for example, the assistant circuit 223 may confirm the stability of the output voltage of the DC/DC converter 1021, and then may activate the controller 222*b* and the like. In the following explanation, it is assumed that the output voltage of the DC/DC converter 1021 is stable, however, when the rotation rate of the motor 105 decreases and the operation of the DC/DC converter 1021 stops, the control system 1022*b* stops its operation at that stage. In addition, at this stage, the assistant circuit 223 or the like may determine whether or not an appropriate battery pack 101 is coupled, for example, based on the signal at a connecting part other than the connecting parts "a" to "c", and when the appropriate battery pack 101 is not coupled, the assistant circuit 223 may stop the activation of the controller 222*b* of the control system 1022*b* and the like.

Thus, by utilizing the DC/DC converter provided in the conventional motor driving control apparatus, it becomes possible to automatically activate the control system 1022*b*.

Furthermore, at this stage, the controller 222*b* may confirm whether or not a mode in which the automatic activation is prohibited is set, for example, in the memory 2222, and may stop its operation without performing subsequent operations, when the mode in which the automatic activation is prohibited is set.

Figure 5B:
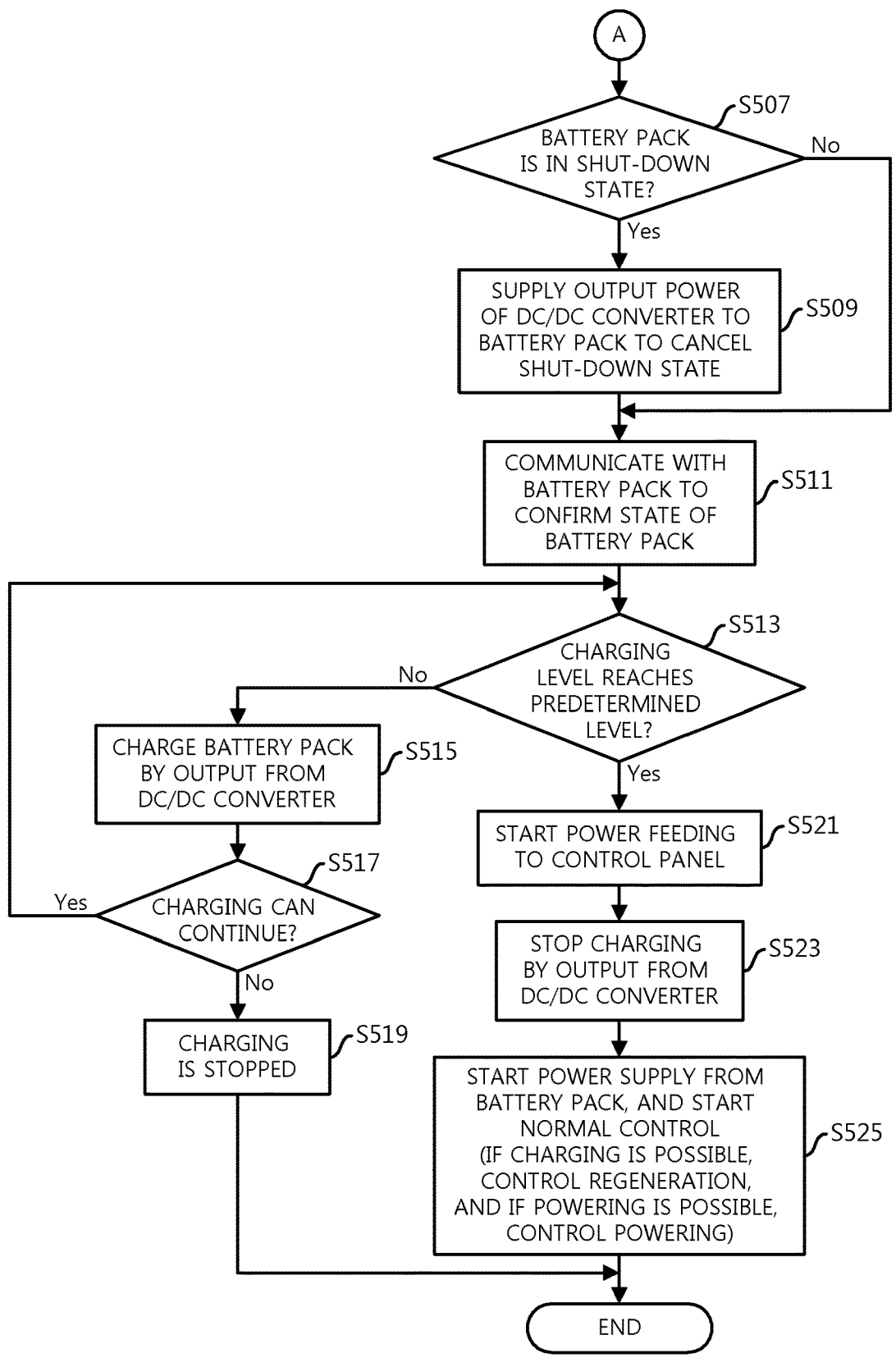
FIG. 5B is a diagram depicting the operational flow relating to the second embodiment.

Shifting to the explanation for FIG. 5B through terminal A, the controller 222*b* of the control system 1022*b* determines whether or not the battery pack 101 is in the shut-down state, based on the voltage at the connecting part "a" for the power supply and charging, for example (step S507). In case of the battery pack 101 which has a connecting part or like, which represents the shut-down state and is other than the connecting part "a" for the power supply and charging, the state may be determined based on the signal from such a connecting part.

When the battery pack 101 is not in the shut-down state, the processing shifts to step S511. On the other hand, when the battery pack 101 is in the shut-down state, the controller 222*b* turns ON the FET SW2 to supply the output power of the DC/DC converter 1021 to the battery pack 101 to release the shut-down state of the battery pack 101 (step S509).

Accordingly, it is possible for the driver to omit the effort to release the shut-down state, which is performed by removing the battery pack 101 from the electrically assisted bicycle 1 and installing the battery pack 101 to a battery charger connected with the commercial power supply.

When the battery pack 101 is in the shut-down state, the controller 1012 of the battery management system 1010 in the battery pack 101 also stops its operation. Therefore, the control system 1022*b* cannot obtain the state information from the battery pack 101. Thus, when the shut-down state is released, the controller 1012 can collect various state information from the sensors 1011, and the controller 222b of the control system 1022b can obtain the state information of the battery pack 101.

Then, the controller 222b communicates with the controller 1012 of the battery pack 101 through the connecting part "b" for the communication by using the communication unit 221, to confirm the state of the battery pack 101 (step S511). This step is similar to the step S307 in the first embodiment, and for example, the controller 222b obtain, according to the predetermined protocol, data such as the temperature of the battery cells 1015, charging level, the voltage state of the battery cells 1015, usage history and the operation mode. The information on whether or not the charging for the battery pack 101 can be performed and the like may be further obtained from a connecting part other than the connecting part "b" for the communication. Such information is also outputted by the controller 1012 of the battery management system 1010 in the battery pack 101.

Then, the controller 222b determines whether or not the charging level of the battery pack 101 reaches the predetermined level (step S513). The predetermined level is a level at which the charging of the battery pack 101 by the regenerative driving can be performed. When the regenerative driving is performed, the control system 1022b, the motor driving controller 1023 and the like work. Therefore, the consumed electrical power of the motor driving control apparatus 102b increases. When the charging level is too low, the power charged in the battery pack 101 may be exhausted. Therefore, the aforementioned predetermined level is checked.

When the charging level of the battery pack 101 does not reach the predetermined level, the controller 222b performs the charging for the battery pack 101 by using the output of the DC/DC converter 1021 (step S515). When the battery pack 101 is not in the shut-down state, the FET SW2 is not turned ON. Therefore, at this stage, the FET SW2 is turned ON to supply the output power of the DC/DC converter 1021 through the connecting part "a" for the power supply and charging to the battery pack 101.

However, even when the charging by the output of the DC/DC converter 1021 is performed at the step S515, the controller 222b determines whether or not the charging can continue (step S517). For example, periodically, the voltage at the connecting part "a" for the power supply and charging is measured, and when the voltage does not increase even after a predetermined time period passed, it is determined that it is impossible to continue the charging as any trouble occurs in the battery pack 101. In addition, for example, periodically, the controller 222b checks the state by communicating with the controller 1012 of the battery pack 101, and determines that it is impossible to continue the charging, also when any trouble is detected. It may be determined that it is impossible to charge the battery pack 101, also when the charging current is measured but not detected.

When it is determined that it is possible to continue the charging, the processing returns to the step S513. On the other hand, when it is determined that it is impossible to continue the charging, the operational flow ends (step S519). This is because the utilization of the battery pack 101 is not appropriate.

When it is determined at the step S513 that the charging level of the battery pack 101 reaches the predetermined level, the controller 222b starts the power supply to the control panel 106 (step S521). Accordingly, the display by LED or the like on the control panel 1016 is performed, and the driver can recognize the automatic activation.

Moreover, because the regenerative driving is performed, the controller 222b turns OFF the FET SW2, and stops the charging by using the output of the DC/DC converter 1021 (step S523).

Moreover, the controller 222b of the control system 1022b turns ON the PET SW1 by turning ON the switch S2 to start the power supply from the battery pack 101, and starts its normal operation (step S525).

More specifically, when it is possible to charge the battery pack 101 according to the running state, the controller 222b causes the motor driving controller 1023 to perform the appropriate regenerative driving. In addition, when it is possible to perform the power driving according to the running state and the state of the battery pack 101, the controller 222b causes the motor driving controller 1023 to perform the appropriate power driving at appropriate timings.

For example, when the charging level is low to perform the power driving, the regenerative driving is performed according to the running state to increase the charging level, and when the charge level reaches the charge level at which the power driving can be performed, the power driving is also performed. On the other hand, when the charging level is equal to or greater than the level at which the power driving can be performed, the power driving and regenerative driving are performed according to the running state while switching them.

Even by adopting the aforementioned configuration, the operation of the motor driving control apparatus 102b automatically begins even when the driver forgets any instruction to start the operation for the motor driving control apparatus 102b and starts the pedaling. Therefore, the usability of the driver is enhanced.

Moreover, when the charging level is low to perform the regenerative driving, it becomes possible to charge the battery by using the counter electromotive force. Therefore, it is possible to omit the charging by using the battery charger connected with the commercial power supply in this aspect, therefore, the trouble of the driver can be reduced.

Furthermore, after it is determined based on the state of the battery pack 101 that the charging level reaches the charging level at which the charging by using the regeneration can be performed, the power supply is performed to the control panel 106. Accordingly, it is possible to notify that the control of the motor driving control apparatus 102b can be performed to some extent.

In addition, it becomes possible to handle a case in which the charging cannot continue.

Although the embodiments of the present invention were explained above, this invention is not limited to those. For example, the battery pack 101 and the motor driving control apparatus 102 or 102b are separately provided in the aforementioned embodiments, however, at least a part of the embodiments is effective for an integrated apparatus of them.

Moreover, the configurations of the control system 1022 and 1022b are mere examples, and the aforementioned functions may be realized on dedicated circuits, instead of the mode in which the predetermined programs are executed by the microprocessor.

Furthermore, as described above, there are various modes of the interface between the battery pack 101 and the motor driving control apparatus 102 or 102b, and there are various kinds of data that can be obtained by the motor driving control apparatus 102 or 102b. However, it is only necessary to obtain data by which the aforementioned determination can be made.

In addition, various changes may be made for the aforementioned operational flows. For example, the start of the power supply for the control panel 106 may be delayed. For example, at the timing of the power driving, the power supply may be made for the control panel 106. In addition, any technical elements may be selected from among the elements of the first embodiment and/or the second embodiment, arbitrarily, and the selected technical elements may be combined, arbitrarily. Furthermore, any technical element may be removed from the first and/or second embodiments according to the purpose to be achieved.

Furthermore, the assistant circuit 223 relating to the second embodiment may further have a part of the functions that the controller 222b performs.

The outline of the aforementioned embodiments is as follows:

A motor driving control apparatus relating to the embodiments includes: (A) a first controller configured to control powering and regeneration of a motor; (B) a second controller configured to control the first controller; and (C) an assistant unit (or circuitry) configured to activate the second controller in a stop state, when a counter electromotive force caused by the motor, which is rotated without control by the first controller (e.g. which is rotated by an external force), satisfies a predetermined condition (e.g. a condition that the counter electromotive force that is equal to or greater than a predetermined level is detected, a condition that the counter electromotive force that is equal to or greater than the predetermined level is detected and other conditions are satisfied), in a state where a power-on instruction for the motor driving control apparatus is not made (e.g. before the power-on instruction for the motor driving control apparatus is made).

With this configuration, even when the user forgets to press the power switch, the motor driving control apparatus is automatically activated, thereby the usability of the user is enhanced.

The aforementioned assistant unit may activate the second controller by the counter electromotive force or an electrical power supplied from an electrical power storage apparatus in response to the counter electromotive force. The counter electromotive force caused by the motor, which is rotated without by the control of the first controller, can be used when the voltage due to the counter electromotive force is rectified and converted to an appropriated voltage.

The aforementioned second controller may be further configured to: (b1) confirm a state of an electrical power storage apparatus coupled with the motor driving control apparatus to determine whether an electrical power supply using the counter electromotive force is required for the electrical power storage apparatus; and (b2) conduct the electrical power supply using the counter electromotive force for the electrical power storage apparatus, when the electrical power supply using the counter electromotive force is required. With this configuration, it becomes possible to cope with a case where the electrical storage apparatus is in a power-saving state or where the charging level of the electrical storage apparatus is very low.

The aforementioned second controller may be further configured to: (b3) determine whether an electrical power storage apparatus coupled with the motor driving control apparatus is in a power-saving state; and (b4) conduct an electrical power supply using the counter electromotive force for the electrical power storage apparatus. With this configuration, the trouble of the user can be reduced because the return from the shut-down state (or cancellation of the shut-down state) can be made automatically.

Furthermore, the aforementioned second controller may be further configured to: (b5) confirm a state of an electrical power storage apparatus coupled with the motor driving control apparatus to determine whether a charging level of the electrical power storage apparatus is equal to or less than a predetermined level; and (b6) conduct charging using the counter electromotive force for the electrical power storage apparatus, when the charging level is equal to or less than the predetermined level. Thus, it is also possible to cope with a case where the charging level is very low. The state of the electrical power storage apparatus may be checked by communicating with the electrical power storage apparatus, and/or may be checked by the output voltage of the output voltage terminal of the electrical power storage apparatus or the like.

Moreover, the aforementioned second controller may be further configured to: (b7) determine whether the electrical power storage apparatus is in a state where charging for the electrical power storage apparatus by regeneration controlled by the first controller is possible; and (b8) stop the electrical power supply or charging using the counter electromotive force when it is determined that the electrical power storage apparatus is in the state where the charging by the regeneration is possible. For example, charging using the counter electromotive force caused by the motor which is rotated without the control of the first controller is switched to charging using the regeneration can be switched, appropriately.

Moreover, the aforementioned second controller may be further configured to: (b9) determine whether an electrical power storage apparatus coupled with the motor driving control apparatus is in a state where charging for the electrical power storage apparatus by regeneration controlled by the first controller is possible; and (b10) start control for the first controller for the regeneration, when it is determined that the electrical power storage apparatus is in the state where the charging by the regeneration is possible. With this configuration, the efficient charging is performed.

In addition, the aforementioned second controller may be further configured to start an electrical power supply to a control panel coupled with the motor driving control apparatus after charging by regeneration controlled by the first controller for the electrical power storage apparatus becomes possible or after the second controller is activated. By starting the power supply to the control panel at the timing that the motor driving control apparatus is activated and can control to some extents, it becomes possible to make the user recognize the activation of the motor driving control apparatus at that timing.

Moreover, the aforementioned second controller may be further configured to: (b12) confirm a state of an electrical power storage apparatus coupled with the motor driving control apparatus to determine whether an electrical power supply from the electrical power storage apparatus to the second controller is possible; and (b13) stop an operation of the second controller when the electrical power supply from the electrical power storage apparatus to the second controller is not possible. There is a case where it is impossible to perform the continuous operation according to the state of the electrical power storage apparatus, and this is to cope with such a case.

Furthermore, the aforementioned second controller may be further configured to: (b14) confirm whether an activation by the assistant unit is allowed; and (b15) stop an operation of the second controller when the activation by the assistant unit is not allowed. This is because the user may not want the automatic activation.

The aforementioned assistant unit may include: (c1) a rectifier configured to rectify a voltage of the counter electromotive force; and (c2) a circuit configured to turn on a switch for conducting an electrical power supply from an electrical power storage apparatus coupled with the motor driving control apparatus to the second controller, when the rectified voltage becomes equal to or greater than a predetermined voltage.

The aforementioned configurations are not limited to matters described in the aforementioned embodiments, and may be implemented by another configuration, which realizes the substantially same effects.

What is claimed is:

1. A motor driving control apparatus configured to be installed on a vehicle that has a motor and a battery pack that includes a rechargeable battery, for controlling driving and regenerative braking of the motor with the battery pack, comprising:
   a bridge circuit having a plurality of switches to be connected to the motor;
   a first controller controlling turning ON and OFF of the plurality of switches so as to control driving and regenerative braking of the motor when the motor driving control apparatus is installed on the vehicle;
   a second controller configured to communicate with one or more sensors on the vehicle detecting a driving status of the motor so as to control the first controller in accordance with the driving status when the motor driving control apparatus is installed on the vehicle;
   assistant circuitry configured to, when the motor driving control apparatus is installed on the vehicle, cause the second controller to be powered when a counter electromotive force that is greater than a prescribed level is generated at the motor while neither of the first controller nor the second controller have yet been powered on,
   wherein when the counter electromotive force that is greater than the prescribed level is generated at the motor while neither of the first controller nor the second controller have yet been powered on, the assistant circuitry causes the second controller to be powered by an electrical power from the battery, or causes the second controller to be powered by an electrical power from the counter electromotive force that is generated at the motor without driving the plurality of switches.

2. The motor driving control apparatus as set forth in claim 1,
   wherein when the counter electromotive force that is greater than the prescribed level is generated at the motor while neither of the first controller nor the second controller have yet been powered on, the assistant circuitry causes the second controller to be powered by the electrical power from the counter electromotive force that is generated at the motor without driving the plurality of switches, and
   wherein when powered by the electrical power from the counter electromotive force without driving the plurality of switches, the second controller is configured to:
       confirm a state of the battery pack to determine whether the battery pack needs to be supplied with the electrical power from the counter electromotive force; and
       cause the battery pack to be supplied with the electrical power from the counter electromotive force when determining that the battery pack needs to be supplied with the electrical power from the counter electromotive force.

3. The motor driving control apparatus as set forth in claim 1,
   wherein when the counter electromotive force that is greater than the prescribed level is generated at the motor while neither of the first controller nor the second controller have yet been powered on, the assistant circuitry causes the second controller to be powered by the electrical power from the counter electromotive force that is generated at the motor without driving the plurality of switches, and
   wherein when powered by the electrical power from the counter electromotive force without driving the plurality of switches, the second controller is configured to:
       determine whether the battery pack is in a shut-down state; and
       cause the electrical power from the counter electromotive force to be supplied to the battery pack so as to cancel the shut-down state and activate the battery pack.

4. The motor driving control apparatus as set forth in claim 1,
   wherein when the counter electromotive force that is greater than the prescribed level is generated at the motor while neither of the first controller nor the second controller have yet been powered on, the assistant circuitry causes the second controller to be powered by the electrical power from the counter electromotive force that is generated at the motor without driving the plurality of switches, and
   wherein when powered by the electrical power from the counter electromotive force without driving the plurality of switches, the second controller is configured to:
       confirm a state of the battery to determine whether a charging level of the battery is less than a predetermined level; and
       cause the battery to be charged by the electrical power from the counter electromotive force without driving the plurality of switches when the charging level is determined to be less than the predetermined level.

5. The motor driving control apparatus as set forth in claim 2, wherein when powered by the electrical power from the counter electromotive force without driving the plurality of switches, the second controller is further configured to:
   confirm a state of the battery to determine whether a charging level of the battery is less than a predetermined level;
   cause the battery to be charged by the electrical power from the counter electromotive force without driving the plurality of switches when the charging level is determined to be less than the predetermined level; and
   when the charging level reaches the predetermined level or greater while the battery is being charged by the electrical power from the counter electromotive force without driving the plurality of switches, stop the charging of the battery by the electrical power from the counter electromotive force that is generated at the motor without driving the plurality of switches, and cause the battery to be charged by regenerative braking of the motor through operations of the plurality of switches by activating the first controller.

6. The motor driving control apparatus as set forth in claim 3, wherein when powered by the electrical power from the counter electromotive force without driving the plurality of switches, the second controller is further configured to:
confirm a state of the battery to determine whether a charging level of the battery is less than a predetermined level;
cause the battery to be charged by the electrical power from the counter electromotive force without driving the plurality of switches when the charging level is determined to be less than the predetermined level; and
when the charging level reaches the predetermined level or greater while the battery is being charged by the counter electromotive force without driving the plurality of switches, stop the charging of the battery by the electrical power from the counter electromotive force that is generated at the motor without driving the plurality of switches, and cause the battery to be charged by regenerative braking of the motor through operations of the plurality of switches by activating the first controller.

7. The motor driving control apparatus as set forth in claim 4, wherein when the charging level of the battery reaches the predetermined level or greater while the battery is being charged by the counter electromotive force without driving the plurality of switches, the second controller is configured to:
stop the charging of the battery by the electrical power from the counter electromotive force that is generated at the motor without driving the plurality of switches, and cause the battery to be charged by regenerative braking of the motor through operations of the plurality of switches by activating the first controller.

8. The motor driving control apparatus as set forth in claim 1, wherein the second controller is further configured to:
determine whether the battery is in a state where charging of the battery by regenerative braking of the motor through operations of the plurality of switches controlled by the first controller is possible; and
start controlling the first controller to operate the plurality of switches for the regenerative braking when the battery is determined to be in the state where the charging by the regenerative braking is possible.

9. The motor driving control apparatus as set forth in claim 1, further comprising a control panel, wherein the second controller is further configured to cause an electrical power to be supplied to the control panel after charging by regeneration controlled by the first controller for the battery coupled with the motor driving control apparatus becomes possible or after the second controller is activated.

10. The motor driving control apparatus as set forth in claim 1, wherein the second controller is further configured to:
confirm a state of the battery pack to determine whether the battery pack can provide an electrical power to power the second controller; and
stop an operation of the second controller when the battery controller determines that the battery pack cannot provide the electrical power to the second controller.

11. The motor driving control apparatus as set forth in claim 1, wherein the assistant circuitry can be disabled by a user as a user selectable option so that the second controller will not be activated unless the user turns on a power switch, even if the counter electromotive force that is greater than the prescribed level is generated at the motor.

12. The motor driving control apparatus as set forth in claim 1, wherein the assistant circuitry comprises:
a rectifier configured to rectify a voltage of the counter electromotive force generated at the motor; and
a circuit configured to turn on a switch for conducting an electrical power from the battery to the second controller, when the rectified voltage becomes equal to or greater than a predetermined voltage.

13. The motor driving control apparatus as set forth in claim 1, further comprising:
a user-operable power switch to turn on the motor driving control apparatus, the power switch, when turned on, causing the second controller to be powered by an electrical power from the battery,
wherein, when the motor driving control apparatus is installed on the vehicle, the assistant circuitry causes the second controller to be powered when the counter electromotive force that is greater than the prescribed level is generated at the motor while the power switch has not been turned on to power the first controller or the second controller.

14. An electrically assisted vehicle, comprising:
one or more wheels;
a motor driving at least one of the one or more wheels;
a battery pack including a rechargeable battery;
a motor driving control apparatus for controlling driving and regenerative braking of the motor with the battery pack, the motor driving control apparatus comprising:
a bridge circuit having a plurality of switches to be connected to the motor;
a first controller controlling turning ON and OFF of the plurality of switches so as to control driving and regenerative braking of the motor;
a second controller configured to communicate with one or more sensors detecting a driving status of the motor so as to control the first controller in accordance with the driving status; and
assistant circuitry configured to cause the second controller to be powered when a counter electromotive force that is greater than a prescribed level is generated at the motor while neither of the first controller nor the second controller have yet been powered on,
wherein when the counter electromotive force that is greater than the prescribed level is generated at the motor while neither of the first controller nor the second controller have yet been powered on, the assistant circuitry causes the second controller to be powered by an electrical power from the battery, or causes the second controller to be powered by an electrical power from the counter electromotive force that is generated at the motor without driving the plurality of switches.

15. The electrically assisted vehicle according to claim 14, further comprising:
a user-operable power switch to turn on the motor driving control apparatus, the power switch, when turned on, causing the second controller to be powered by an electrical power from the battery,
wherein the assistant circuitry causes the second controller to be powered when the counter electromotive force that is greater than the prescribed level is generated at the motor while the power switch has not been turned on to power the first controller or the second controller.

* * * * *